United States Patent
Nammi et al.

(10) Patent No.: US 9,949,251 B2
(45) Date of Patent: Apr. 17, 2018

(54) METHODS AND USER EQUIPMENTS FOR DATA DEMODULATION

(71) Applicant: TELEFONAKTIEBOLAGET L M ERICSSON (PUBL), Stockholm (SE)

(72) Inventors: Sairamesh Nammi, Kista (SE); Namir Lidian, Solna (SE); Johan Bergman, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 50 days.

(21) Appl. No.: 14/891,988

(22) PCT Filed: May 31, 2013

(86) PCT No.: PCT/SE2013/050637
§ 371 (c)(1),
(2) Date: Nov. 18, 2015

(87) PCT Pub. No.: WO2014/193283
PCT Pub. Date: Dec. 4, 2014

(65) Prior Publication Data
US 2016/0128031 A1    May 5, 2016

(51) Int. Cl.
*H04W 72/04* (2009.01)
*H04L 1/16* (2006.01)
*H04L 1/18* (2006.01)

(52) U.S. Cl.
CPC ......... *H04W 72/042* (2013.01); *H04L 1/1671* (2013.01); *H04L 1/1812* (2013.01); *H04L 1/1829* (2013.01); *H04W 72/0413* (2013.01)

(58) Field of Classification Search
CPC ..... H04L 5/005; H04L 5/0048; H04L 5/0051; H04L 5/0007; H04L 1/0026;
(Continued)

(56) References Cited

U.S. PATENT DOCUMENTS

| | | | | |
|---|---|---|---|---|
| 8,565,330 B2* | 10/2013 | Seki | ...................... | H04L 1/0006 375/259 |
| 2006/0013338 A1* | 1/2006 | Gore | ...................... | H04L 5/005 375/324 |

(Continued)

FOREIGN PATENT DOCUMENTS

| | | |
|---|---|---|
| EP | 1845636 A1 | 10/2007 |
| EP | 2257017 A2 | 12/2010 |

(Continued)

OTHER PUBLICATIONS

3GPP TS 25.212 V11.0.0, 3rd Generation Partnership Project; Technical Specification Group Radio Access Network; Multiplexing and channel coding (FDD) (Release 11), Dec. 2011.

(Continued)

*Primary Examiner* — Kashif Siddiqui

(57) ABSTRACT

Methods and user equipment (UE) for data demodulation. A UE comprises a receiver (Rx), a transmitter (Tx), a demodulator, a decoder, a processor, and a memory. An order message can be received by the receiver from a radio network node. The order message orders the UE to utilize both additional pilots and common pilots. In response to the receiver receiving the order message, the transmitter may return an ACK message to the radio network node. The receiver may also be configured to receive data from the radio network node. The memory stores computer program code which, when run in the processor, causes the demodulator to demodulate received data utilizing additional pilots in addition to common pilots. Furthermore, the memory and the computer program code are configured to, together with the processor, cause the demodulator to demodulate received data utilizing only common pilots when the decoder is unsuccessful in decoding received data demodulated by utilizing additional pilots in addition to common pilots.

12 Claims, 3 Drawing Sheets

(58) Field of Classification Search
CPC ....... H04L 5/0053; H04B 7/0413; H04B 1/76; H04W 72/04; H04W 24/10; H04W 48/16; H04W 36/30; H04W 88/06; H04W 72/042; H04W 88/02; H04J 2203/0019
See application file for complete search history.

(56) References Cited

U.S. PATENT DOCUMENTS

| | | | |
|---|---|---|---|
| 2006/0018287 A1* | 1/2006 | Walton | H04B 7/0413 370/334 |
| 2006/0171342 A1* | 8/2006 | Dateki | H04W 52/58 370/311 |
| 2007/0149249 A1* | 6/2007 | Chen | H04L 1/0026 455/561 |
| 2008/0219361 A1* | 9/2008 | Guey | H04L 5/0007 375/260 |
| 2008/0225993 A1* | 9/2008 | Malladi | H04L 5/0007 375/340 |
| 2011/0111781 A1* | 5/2011 | Chen | H04B 7/02 455/507 |
| 2011/0116569 A1* | 5/2011 | Vaughan | H04B 1/0483 375/295 |
| 2013/0308553 A1* | 11/2013 | Cozzo | H04L 1/0027 370/329 |

FOREIGN PATENT DOCUMENTS

| | | |
|---|---|---|
| EP | 2453619 A1 | 5/2012 |
| RU | 2359413 C1 | 10/2010 |
| RU | 2402167 C1 | 10/2010 |
| WO | 2008112803 A2 | 9/2008 |

OTHER PUBLICATIONS

3GPP TS 25.214 V11.0.0, 3rd Generation Partnership Project; Technical Specification Group Radio Access Network; Physical layer procedures (FDD) (Release 11), Dec. 2011.

3GPP TSG-RAN meeting #53, RP-111393, New WI: Four Branch MIMO transmission for HSDPA (feature part), Ericsson, Fukuoka, Japan, Sep. 13-16, 2011.

3GPP TSG-RAN meeting #53, RP-111393, New WI: Four Branch MIMO transmission for HSDPA (performance part), Ericsson, Fukuoka, Japan, Sep. 13-16, 2011.

3GPP TSG-RAN meeting #53, RP-111393, New WI: Four Branch MIMO transmission for HSDPA (core part), Ericsson, Fukuoka, Japan, Sep. 13-16, 2011.

3GPP TSG-RAN WG1 Meeting #65, R1-111763, 4-branch MIMO for HSDPA, Ericsson, Barcelona, Spain, May 9-13, 2011.

3GPP TSG-RAN WG1 #70, Remaining Issues in the Pilot Design Schemes in Four branch MIMO System, R1-123754, Qingdao, P.R. of China, Aug. 13-17, 2012.

Ericsson, 3GPP TSG-RAN WG1 #70, HS-SCCH Orders in Four Branch MIMO System, R1-123761, Qingdao, P.R. of China, Aug. 13-17, 2012.

Ericsson, 3GPP TSG-RAN WG1 #70bis, Common HS-SCCH Orders in Four Branch MIMO System, R1-124504, San Diego, USA, Oct. 8-12, 2012.

* cited by examiner

METHODS AND USER EQUIPMENTS FOR DATA DEMODULATION

This application is a 371 of International Application No. PCT/SE2013/050637, filed May 31, 2013, the disclosure of which is fully incorporated herein by reference.

TECHNICAL FIELD

Embodiments of the present invention presented herein generally relate to telecommunication. More particularly, this disclosure presents methods and apparatuses for data demodulation.

BACKGROUND

This section is intended to provide a background to the various embodiments of the technology that are described in this disclosure. Therefore, unless otherwise indicated herein, what is described in this section should not be interpreted to be prior art by its mere inclusion in this section.

The international patent application PCT/SE2013/050336 which was filed on Mar. 26, 2013 by Telefonaktiebolaget LM Ericsson (publ.), proposes a method performed by a radio network node, wherein the radio network node is configured to communicate over an air interface with a wireless terminal (also known as mobile station and/or user equipment (UE)). The method proposed in PCT/SE2013/050336 comprises scheduling pilots, including common pilots transmitted for channel estimation, for transmission over the air interface to the UE. The method further comprises making a determination whether additional pilots for data demodulation are also to be transmitted to the UE in addition to the common pilots transmitted for channel estimation. A corresponding method performed by the UE is also proposed. This method comprises making a determination regarding which pilots transmitted from the radio network node are to be utilized by the UE, the pilots transmitted from the radio network node including common pilots for channel estimation and additional pilots for data demodulation.

FIG. 1 illustrates an example signaling diagram used for signaling demodulation pilots. The radio network node (e.g., an evolved NodeB (eNB)) transmits common pilots continuously for Channel State Information (CSI) estimation (act 110). The UE may compute, estimate or otherwise determine CSI such as Channel Quality Information (CQI), Precoding Control Index (PCI), and Rank Information (RI) and report back (act 120) to the radio network node, e.g. over a High Speed-Dedicated Physical Control Channel (HS-DPCCH). Once the CSI report is received by the radio network node, the radio network node can determine whether only the common pilots are sufficient for data demodulation, or whether the additional pilots are also desirable. For example, this determination can be made based on parameters such as Signal to Noise Ratio (SNR), Signal to Interference plus Noise Ratio (SINR), block error rate (BLER), UE location, modulation and code rate, etcetera. The determination can e.g. be made by a pilot determination controller or a scheduler of the radio network node. If it is determined or otherwise concluded that additional pilots are needed or desirable, the radio network node can signal (i.e. transmit) information indicative of the need or desire to use additional pilots to the UE (act 130). For example, this information can be transmitted using a High Speed Shared Control Channel, HS-SCCH, order message. HS-SCCH order messages are known to persons skilled in the art and will therefore not be further detailed herein. If the UE is capable of decoding the HS-SCCH order message, the UE transmits an acknowledgement (ACK) message to the radio network node 100, e.g. over a HS-DPCCH (act 140). Subsequently, upon receipt of such ACK message, the radio network node transmits data to the UE 200 (act 150). The data includes the additional pilots. The data can e.g. be transmitted over a High Speed-Physical Data Shared Channel, HS-PDSCH. The UE then uses the additional pilots for demodulation until again informed by the radio network node. Act 160 is intended to reflect another, or new, order message over the HS-SCCH. Act 170 illustrates subsequent transmission of data over a downlink data channel, such as a High Speed-Physical Data Shared Channel (HS-PDSCH).

SUMMARY

It is in view of the above considerations and others that the various embodiments of the present invention have been made.

While the methods and apparatuses described in the background have several advantages, the inventors of the technology described in this disclosure have realized that there is still a need for further improvements. In view of this, it is a general object of the various embodiments of the present invention to provide for an alternative, or improved, data demodulation.

For example, the inventors have realized that when carrying out the technology described in the background section, there might exist instances when the UE transmits an ACK message and the radio network node (e.g. a NodeB) erroneously interprets a received ACK message as a negative acknowledgement, NACK, message.

The above scenario is the result of the fact that data transmitted in an HS-SCCH order message is generally not protected using any Cyclic Redundancy Check (CRC). Or said differently, data transmitted in response to a HS-SCCH order message is generally not protected by any CRC.

Thus, in the first case for example, the UE assumes that the radio network node activated the additional pilots and therefore tries to use these pilots (which, in some instances, may not be present in reality) for channel estimation and data demodulation. Hence, subsequently transmitted data (or data packets) will not be successfully decoded by the UE. Or said differently, since the demodulation is not successful the subsequent decoding by the UE is not successful either. An erroneous interpretation, by the radio network node, of the ACK message sent from the UE as a response to a HS-SCCH order (that is ordering the UE to utilize both additional pilots and common pilots) may consequently cause a throughput loss and/or delay in scheduling data transmissions.

Therefore, and in accordance with a first aspect, there is provided a method of data demodulation performed by a user equipment, UE. The UE is configured to utilize different demodulation pilots, wherein the demodulation pilots include common pilots as well as additional pilots for data demodulation. An order message is received from a radio network node over a downlink control channel, e.g. a High Speed-Shared Control Channel (HS-SCCH). The order message is configured to order the UE to utilize both additional pilots and common pilots. For example, the order message may be a data message including a data field including the order, or request, ordering the UE to utilize both additional pilots and common pilots. Also, an acknowledgement (ACK) message is transmitted to the radio network node over an uplink control channel in response to receiving the earlier-mentioned order message. The uplink control channel may e.g. be a High Speed-Dedicated Physical Control Channel (HS-DPCCH). Furthermore, data is received from said radio network node over a downlink data channel, e.g. a High Speed-Physical Data Shared Channel (HS-PDSCH). Yet further, the method comprises demodulating received data utilizing additional pilots in addition to common pilots. If, or when, decoding of the received data demodulated by utilizing additional pilots in addition to common pilots is unsuccessful the method additionally comprises demodulating the received data utilizing common pilots only. That is, when decoding of the received data demodulated by utilizing additional pilots in addition to common pilots is not successful, the additional pilots are no longer used for data demodulation but the method instead continues by demodulating the received data utilizing common pilots only. If so, subsequent decoding of data can only be successful when the data demodulation utilizing the common pilots only has been successful.

The method may additionally comprise transmitting a negative acknowledgement, NACK, message to the radio network node when decoding the received data demodulated by utilizing only common pilots is unsuccessful. The NACK message may e.g. be transmitted over an uplink control channel such as HS-DPCCH.

The method may optionally also comprise continuing demodulating received data utilizing only common pilots until another order message is received from a radio network node over the downlink control channel. The another order message may be configured to order the UE to utilize both additional pilots and common pilots.

In accordance with a second aspect, there is provided a user equipment (UE) configured to utilize different demodulation pilots. The demodulation pilots include common pilots as well as additional pilots for data demodulation. The UE comprises a receiver, a transmitter, a decoder, a processor and a memory. The receiver is configured to receive an order message from a radio network node over a downlink control channel (e.g. HS-SCCH). The order message is configured to order the UE to utilize both additional pilots and common pilots. For example, the order message may be a data message including a data field including the order, or request, ordering the UE to utilize both additional pilots and common pilots. The transmitter is configured to transmit, in response to the receiver receiving the above-mentioned order message, an ACK message to said radio network node over an uplink control channel (e.g. HS-DPCCH). The receiver is also configured to receive data from said radio network node over a downlink data channel (e.g. HS-PDSCH). The UE also comprises a demodulator for data demodulation. The UE also comprises a decoder for decoding received data. The memory stores computer program code which, when run in the processor, causes the demodulator to demodulate received data utilizing additional pilots in addition to common pilots. Furthermore, the memory and the computer program code are configured to, with the processor, cause the demodulator to demodulate received data utilizing only common pilots if, or when, the decoder is unsuccessful in decoding received data demodulated by utilizing additional pilots in addition to common pilots.

In one embodiment, the transmitter is also configured to transmit a NACK message to the radio network node when the decoder is unsuccessful in decoding said received data utilizing only common pilots.

In some embodiments, the memory and the computer program code are also configured to, with the processor, cause the demodulator to continue demodulate received data utilizing only common pilots until the receiver receives another order message from a radio network node over the downlink control channel, wherein the another order message is ordering the UE to utilize both additional pilots and common pilots.

As will be appreciated by those skilled in the art, the radio network (or more specifically, the radio network node) can indicate a selected modulation scheme to the UE via a downlink control channel. The UE can use the pilots as a reference to be able to interpret the different phases and amplitudes of a modulated signal according to the indicated modulation scheme. Also, the radio network (or more specifically, the radio network node) can indicate a chosen code rate to the UE via the downlink control channel. The UE can then use the indicated code rate to be able to decode a demodulated signal. As used herein, the additional pilots are utilized for data demodulation. However, there is generally no error detection possibility in the process of data demodulation. Nevertheless, this has been addressed by the features of the characterizing portion of the appended independent claims. Accordingly, when decoding of the received data demodulated by utilizing additional pilots is unsuccessful this could be an indication that the radio network node never enabled the additional pilots. In other words, it is possible to determine or otherwise conclude whether the data demodulation has been successful or not by trying, or attempting, to decode the received data previously demodulated by the utilization of additional pilots in addition to common pilots. If the decoding is not successful, it can be determined or otherwise concluded that the preceding data demodulation utilizing additional pilots in addition to common pilots was not successful either. This could represent an indication that the radio network node did not enable additional pilots for data demodulation and so there are no such additional pilots present. As a consequence, the UE will instead continue by demodulating the received data utilizing common pilots only (i.e. without utilizing any additional pilots).

The various embodiments of the present invention thus provide for an alternative, or improved, data demodulation. Also, some of the embodiments of the present invention may allow for reducing the potential risk of the earlier-mentioned problem of erroneous interpretations, made by the radio network node, of the ACK message sent from the UE as a response to an HS-SCCH order. In turn, this may have the consequence of improved overall performance, such as improved throughput and/or less delay in scheduling data transmissions.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

Figure 1:
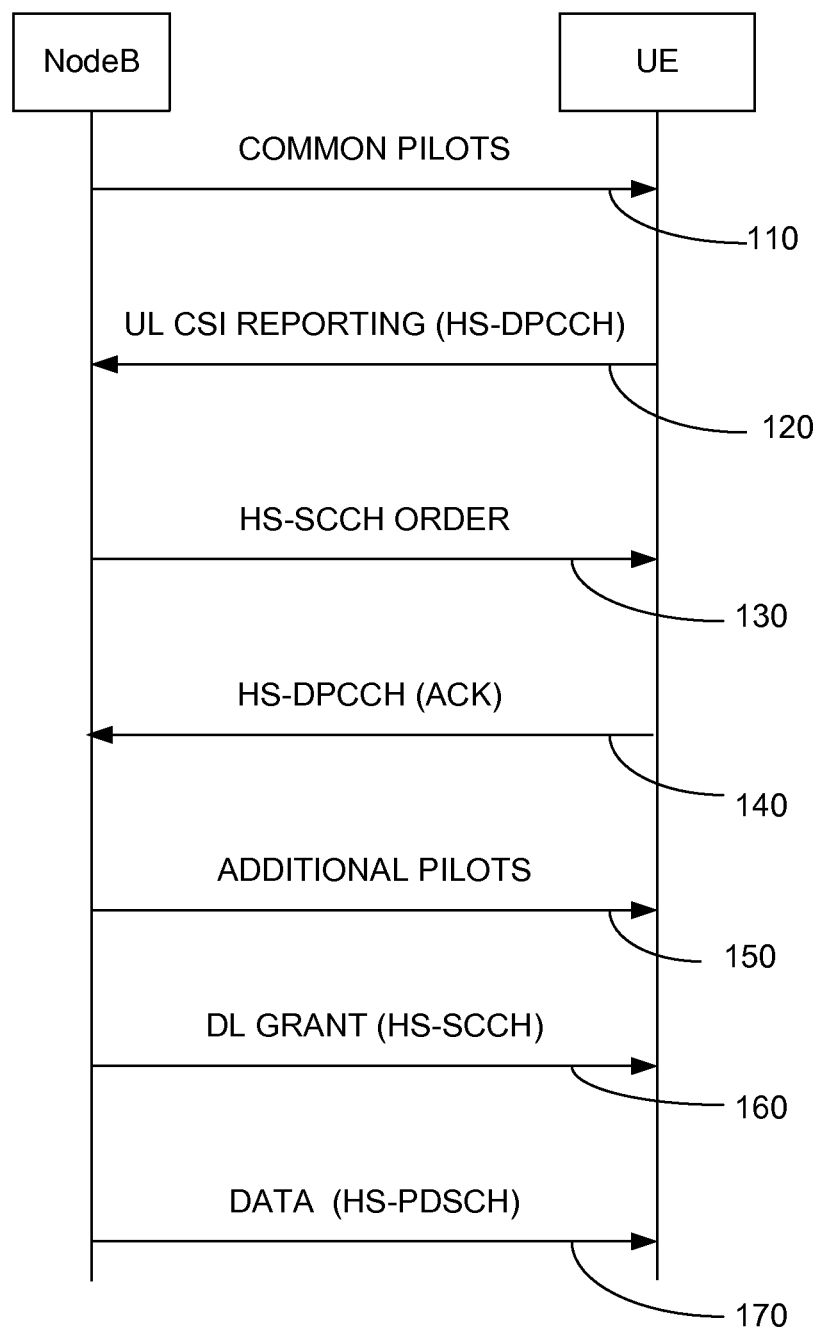
FIG. 1 illustrates an example signaling diagram of a message sequence to signal, or convey, demodulation pilots.
Figure 2:
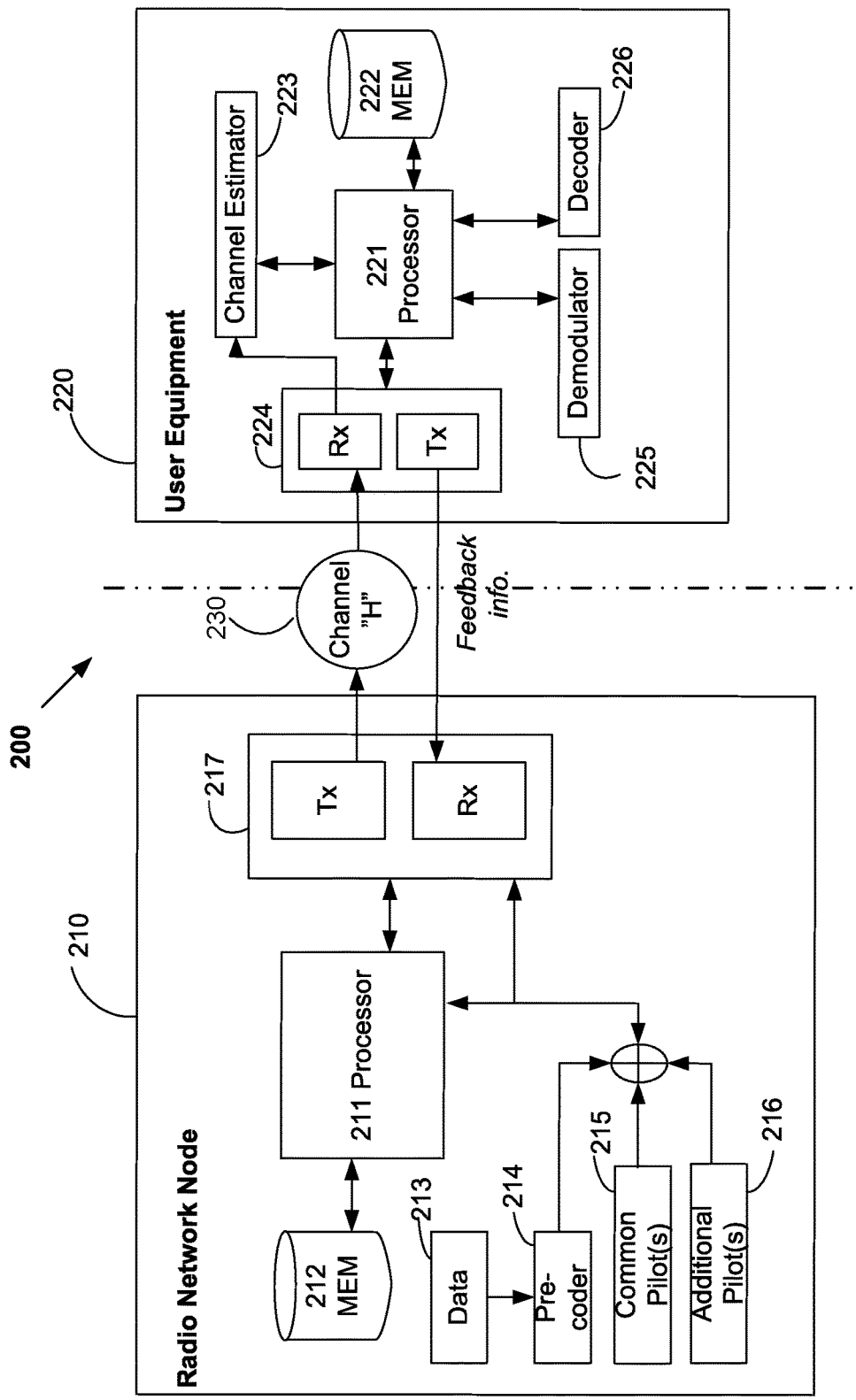
FIG. 2 is a schematic view of an example communication system, which may utilize common pilots as well as additional pilots.

FIG. 2 illustrates a communication system 200 comprising a radio network node 210 and a user equipment (UE) 220. As used herein, the term "radio network node" is used to encompass a node using any technology including, e.g., High Speed Packet Access (HSPA), Long Term Evolution (LTE), Code Division Multiple Access (CDMA), Global System for Mobile Communications (GSM), etc., or a mixture of technologies such as a multi-standard radio (MSR) node (e.g., LTE/HSPA, GSM/HS/LTE, CDMA2000/LTE, etc.). To this end, the radio network node may be embodied as a base station, a radio base station (RBS), a NodeB, an evolved NodeB (eNB), etc. Also, as used in the following the term "user equipment (UE)" is any device, which can be used by a user for communication. Thus, the term UE may be referred to as a wireless terminal, a mobile terminal, a terminal, a user terminal (UT), a wireless communication device, a wireless transmit/receive unit (WTRU), a mobile phone, a cell phone, etc. Yet further, the term UE includes Machine Type Communication (MTC) devices, which do not necessarily involve human interaction.

FIG. 2 shows an example implementation of a communication system 200 wherein both common pilots and additional pilots may be utilized. The radio network node 210 and the UE 220 communicate over an air interface 230, or particularly over a channel, herein denoted channel H.

The radio network node 210 comprises a processor 211 and a memory 212 storing computer program code which, when run in the processor 211, causes the radio network node 210 to perform various tasks, or actions, as will be further detailed herein. The radio network node 210 also comprises, or is connected to a source of data 213. The radio network node may also comprise a pre-coder 214. The pre-coder 214 may be configured to receive data from the data source 213 and generate pre-coded data. Furthermore, the radio network node 210 comprises a common pilot source 215, i.e. a source of common pilots. In addition, the radio network node 210 comprises an additional pilot source 216, i.e. a source of additional pilots which may be used for data demodulation. Typically, but not necessarily, the pilot design scheme applied by the radio network node 210 can be divided into (1) a scheme utilizing common pilots for CSI estimation and for data demodulation and (2) a scheme using common pilots for CSI estimation and additionally utilizing additional pilots for data demodulation.

In one of its aspects, the processor 211 is configured to schedule pilots, including common pilots for CSI estimation, for transmission by means of a transmitter (Tx) of a radio communication interface 217 over the air interface 230 to the UE 220. The radio communication interface 217 may also comprise a receiver (Rx). The processor 211 may be further configured to make a determination, e.g. a selective determination, whether additional pilots for data demodulation are also to be transmitted to the UE 220 in addition to the common pilots transmitted for the CSI estimation. In some embodiments, the radio network node may choose additional pilots based on one or more parameters. For example, the above-mentioned selective determination whether additional pilots are to be utilized for data demodulation may depend on one or more of the following:

Location of one or more UEs served by the radio network node 210;
Downlink channel quality (CQI, SNR, SINR, BER) for one or more UEs served by the radio network node 210. Accordingly, downlink channel quality information may include one or more of the CQI, SNR, SINR and BER;
Uplink signal strength of an uplink signal transmitted from one or several UEs served by the radio network node 210; and
Modulation rate and code rate assigned to one or several UEs served by the radio network node 210.

With continued reference to FIG. 2, the UE 220 comprises a processor 221 and a memory 222 storing computer program code which, when run in the processor 221, causes the radio network node 220 to perform various tasks, or actions, as will be further detailed herein. The UE also comprises a channel estimator 223, which is configured to compute, estimate or otherwise generate a channel estimate. The channel estimate may, e.g., include parameters such as CQI, SNR, SINR, BER, etc. These channel estimates made by the channel estimator 223 can then be fed back, by means of a transmitter (Tx) of a radio communication interface 224, to the radio network node 210. For example, feedback information such as the above-mentioned channel estimate(s) may be transmitted from the UE 220 to the radio network node 210 over an uplink control channel, such as HS-DPCCH. The UE 220 also comprises a demodulator 225 for data demodulation. Furthermore, the UE 220 comprises a data decoder 226 for decoding data, such as data received from the radio network node 210.

As is understood from FIG. 2, the radio network node 210 may thus transmit common pilots (e.g. from the source of common pilots 215) for estimation of channels. The UE 220 may then convey back feedback information to the radio network node 210. The radio network node 210 may subsequently use this feedback information for making its selective determination with respect to additional pilots as mentioned earlier. In the FIG. 2 embodiment, the radio network node 210 may transmit common pilots (from common pilot source 215) for channel estimation and may do so utilizing all antennas (e.g. on four antennas in the case of a four antenna system). Moreover, the radio network node 210 may transmit data and/or additional pilots (from the additional pilot source 216) from all or some of the antennas (e.g. $3^{rd}$ and $4^{th}$ antennas in the case of a four antenna system). For example, in a four antenna system in which there are common pilots for channel estimation transmitted on each antenna, inclusion of additional pilots for data demodulation results in six pilots being transmitted. The additional pilots may increase pilot powers transmitted from the antennas (e.g., $3^{rd}$ and $4^{th}$ antennas as mentioned above), which may allow for increasingly accurate channel estimation to be made for data demodulation. The UE 220, and particularly the channel estimator 223 thereof, may estimate the channels for data demodulation from these additional pilots in addition to the common pilots which are utilized for channel estimation.

A first embodiment of the present invention will now be described with further reference to FIG. 2. As will be appreciated from the description hereinabove, the UE 220 is configured to utilize different demodulation pilots. The different demodulation pilots include common pilots as well as additional pilots, i.e. additional pilots in addition to the common pilots. The receiver (Rx) 224 is configured to receive an order message from the radio network node 210 over a downlink control channel, such as the channel "H". This downlink control channel may e.g. be a HS-SCCH. For example, the order message may be a data message including a data field including the order, or request, ordering the UE to utilize both additional pilots and common pilots. The transmitter (Tx) 224 is configured to transmit, in response to the receiver (Rx) 224 receiving said order message, an ACK message to said radio network node over an uplink control channel, e.g. HS-DPCCH. The ACK message may be a data message including a data field including data indicative of the UE 220 acknowledging the earlier-received order message. The receiver (Rx) 224 is further configured to receive data from the radio network node 210 over a downlink data channel, e.g. HS-PDSCH. The memory 222 stores computer program code which, when run in the processor 221 causes the demodulator 225 to demodulate received data utilizing additional pilots in addition to common pilots (as per the earlier-received order message). Yet further, the memory 222 stores computer program code which, when run in the processor 221, causes the demodulator 225 to demodulate received data utilizing only common pilots (i.e. without additional pilots) when the decoder 226 is unsuccessful in decoding received data demodulated by utilizing additional pilots in addition to common pilots. That is, when the decoder 226 fails to decode received data demodulated by utilizing additional pilots in addition to common pilots, the memory 222 and the computer program code are configured to (together with the processor 221) cause the demodulator 225 to begin demodulating received data utilizing only common pilots. To this end, the memory 222 and computer program code may be further configured to, together with the processor 221, determine or otherwise conclude whether the decoder 226 is successful or unsuccessful in decoding received data demodulated by utilizing additional pilots in addition to common pilots. Also, the UE 220 may optionally comprise a timer or timer function (not shown), which can be implemented either by hardware, software or both hardware and software. For example, the timer or timer function may be started once the decoder 226 begins its attempts to decode received data demodulated by utilizing additional pilots in addition to common pilots. If implemented, when it has not been determined yet that the decoding is successful and when the timer or timer function has expired after the specified time period t1, it can be concluded that no more attempts will be made. In other words, the memory 222 and the computer program code may be configured to (together with the processor 221) cause the demodulator 225 to begin demodulating received data utilizing only common pilots upon expiry of the specified time period t1 (as defined by the timer or timer function).

In one example implementation, the transmitter (Tx) 224 may be further configured to transmit a NACK message to the radio network node 210 when the decoder 226 is unsuccessful in decoding received data utilizing only common pilots. That is, when the decoder 226 fails to decode received data utilizing only common pilots the transmitter (Tx) 224 may transmit the NACK message to the radio network node. In some example implementations, a timer or timer function may be implemented to set a specified time t2 during which the decoder 226 continues its attempts to decode data utilizing only common pilots. If still not successful upon expiry of the specified time t2, the transmitter (Tx) 224 transmits its NACK message to the radio network node 210, thereby notifying the radio network node 210 of the failed decoding attempts.

In one example implementation, the memory 222 and the computer program code are configured to, with the processor 221, cause the demodulator 225 to continue demodulating received data utilizing only common pilots until the receiver (Rx) 224 receives another order message from a radio network node 210 over the downlink control channel. This another order message may be a data message ordering the UE to utilize both additional pilots and common pilots.

Thus, in one aspect of the technology disclosed herein, the radio network node 210 (e.g. a NodeB) may transmit common pilots to the UE 220 for CSI estimation. For data demodulation, the radio network node 210 may transmit additional pilots in addition to the common pilots. The UE demodulates received data utilizing additional pilots in addition to common pilots after having returned an ACK message to the radio network node 210 acknowledging an earlier received order message to utilize additional pilots in addition to common pilots. When a subsequent decoding of received data demodulated by utilizing additional pilots in addition to common pilots is not successful, the UE continue by demodulating received data utilizing only common pilots (i.e. without the additional pilots). It is thus made possible to determine whether the data demodulation has been successful or not by trying or attempting to decode the received data previously demodulated by the utilization of additional pilots in addition to common pilots.

The various embodiments of the present invention may thus provide for an alternative, or improved, data demodulation. First the UE attempts to demodulate received data by utilizing additional pilots and if a subsequent decoding of data fails, the UE continues by demodulating received data utilizing only the common pilots.

Also, some of the embodiments of the present invention may allow for reducing the risk for the earlier-mentioned problem of erroneous interpretations, made by radio network nodes 210, of an ACK message sent from the UE 220 as a response to an order message, e.g. a HS-SCCH order. In turn, this may have the effect of improved overall performance, such as improved throughput and/or less delay in scheduling data transmissions in the communication system 200.

Figure 3:
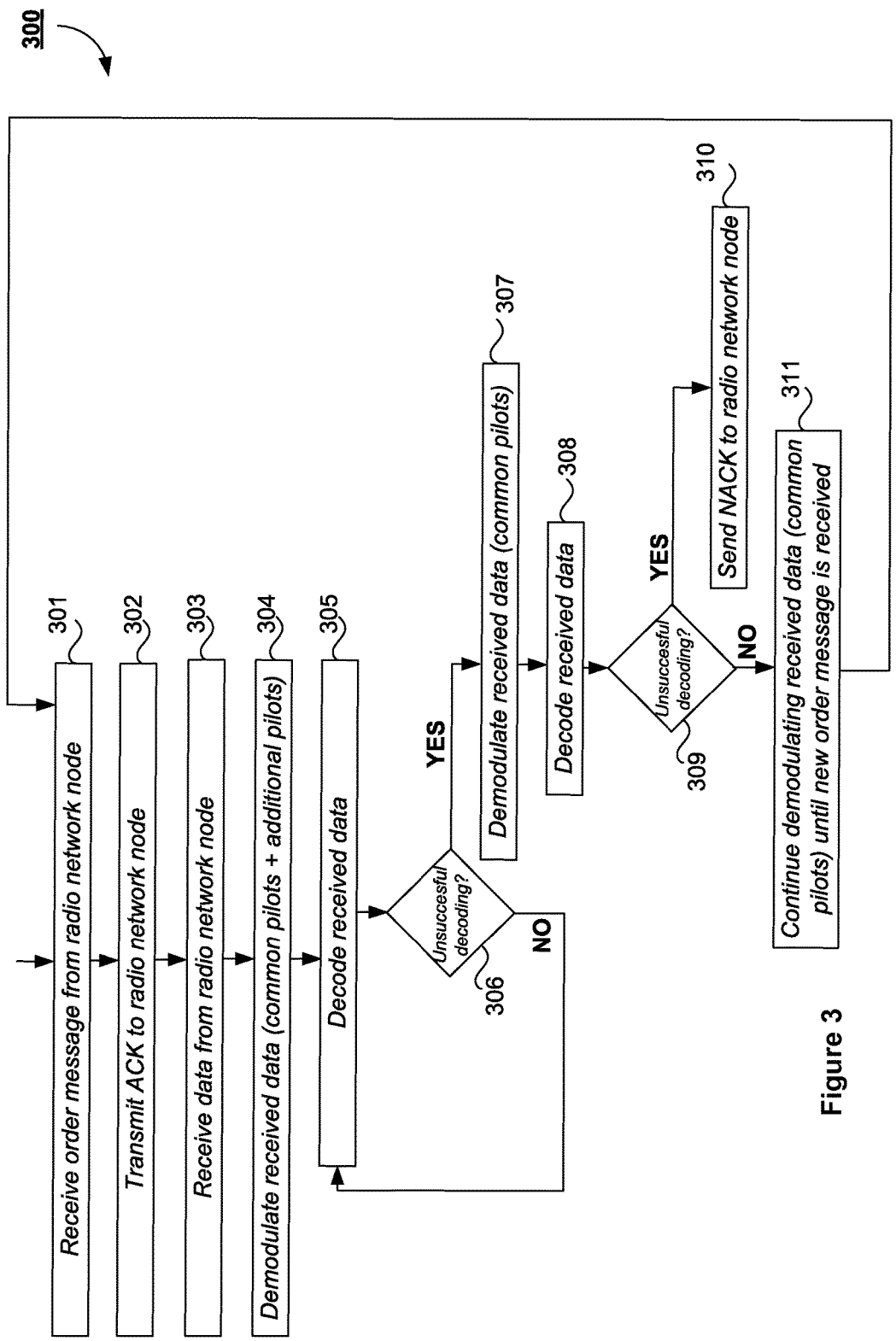
FIG. 3 is a flowchart illustrating an example method performed by a user equipment.

FIG. 3 illustrates an example method 300 performed by a UE, such as the UE 220 as schematically illustrated in FIG. 2. An order message is received 301 from a radio network node over a downlink control channel (e.g., HS-SCCH). This order message is configured to order the UE to utilize both additional pilots and common pilots. For example, the order message may be a data message including a data field including the order for ordering the UE to utilize both additional pilots and common pilots. Subsequently, an ACK message is transmitted 302 to the radio network node over an uplink control channel (e.g., HS-DPCCH) in response to receiving the earlier-mentioned order message. Data is also received from said radio network node over a downlink data channel (e.g., HS-PDSCH). The method 300 further comprises demodulating 304 received data utilizing additional pilots in addition to common pilots.

Next, the received data demodulated by utilizing additional pilots in addition to common pilots is decoded 305. If, or when, decoding 305 of the received data demodulated by utilizing additional pilots in addition to common pilots is unsuccessful (compare "Yes" in step 306) the method additionally comprises demodulating 307 the received data utilizing common pilots only. That is, when decoding 305 of the received data demodulated by utilizing additional pilots in addition to common pilots is not successful, the additional pilots are not used but the method 300 instead continues by demodulating 307 the received data utilizing common pilots only. As will be appreciated, the method 300 may thus include a determination 306 where it is determined or otherwise concluded whether the preceding decoding 305 was successful or unsuccessful. If it is determined 306 or otherwise concluded that the preceding decoding 305 is successful, the decoding 305 of the received data demodulated by utilizing additional pilots in addition to common pilots can be continued. In one implementation, if not all received data is successfully decoded 305 it is determined 306 or otherwise concluded that the decoding failed, i.e. was unsuccessful. In alternative embodiments, if only a pre-defined portion of received data (e.g. less than 75%, 50%, of the total amount of received data, etc.) is successfully decoded 305 it is determined 306 or otherwise concluded that the decoding failed, i.e. was unsuccessful. Here, different alternatives are conceivable and the above-mentioned pre-defined portion of received data should be tested and evaluated for each specific case in view of e.g. specific operator needs or end-user needs.

Again, when decoding 305 of the received data demodulated by utilizing additional pilots in addition to common pilots is not successful, the additional pilots are not used but the method 300 instead continues by demodulating 307 the received data utilizing common pilots only.

If, or when, decoding 308 of the received data demodulated by utilizing common pilots is unsuccessful (compare "Yes" in step 309), a NACK message can be transmitted 310 to the radio network node, thereby notifying the radio network node that the data demodulation failed. On the other hand, the method 300 may continue to demodulate 311 received data utilizing only common pilots if the decoding 308 is successful. For example, the method 300 may comprise continuing to demodulate 311 received data utilizing only common pilots until another, e.g. new, order message is received 301 from a radio network node. As will be appreciated, the method 300 may thus include a determination 308 where it is determined or otherwise concluded whether the preceding decoding 308 (utilizing common pilots only) was successful or unsuccessful. If it is determined 309 or otherwise concluded that the preceding decoding 308 is successful, the decoding 308 of the received data can continue.

Similar to above, if not all received data is successfully decoded 308 it is determined 308 or otherwise concluded that the decoding failed, i.e. was unsuccessful. In alternative embodiments, if only a pre-defined portion of received data (e.g. less than 75%, 50%, of the total amount of received data, etc.) is successfully decoded 308 it is determined 309 or otherwise concluded that the decoding failed, i.e. was unsuccessful. Here, different alternatives are conceivable and the above-mentioned pre-defined portion of received data should be tested and evaluated for each specific case in view of e.g. specific operator needs or end-user needs.

Consequently, when the decoding 305 of received data demodulated by utilizing additional pilots in addition to common pilots is not successful, the UE may continue by demodulating 307 received data utilizing only common pilots (i.e. without the additional pilots). It is thus made possible to determine whether the data demodulation has been successful or not by attempting to decode 305 the received data previously demodulated by the utilization of additional pilots in addition to common pilots. The various embodiments of the present invention may thus provide for an alternative, or improved, data demodulation. First the UE attempts to demodulate received data by utilizing additional pilots and if a subsequent decoding of data fails, the UE continues by demodulating received data utilizing only the common pilots. Also, some of the embodiments of the present invention may allow for reducing the risk for the earlier-mentioned problem of erroneous interpretations, made by radio network nodes 210, of an ACK message sent from the UE 220 as a response to an order message, e.g. a HS-SCCH order. In turn, this may have the effect of improved overall performance, such as improved throughput and/or less delay in scheduling data transmissions in the communication system 200.

In the detailed description hereinabove, for purposes of explanation and not limitation, specific details are set forth such as particular architectures, interfaces, techniques, etc. in order to provide a thorough understanding of various embodiments of the present invention. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the present invention has been described above with reference to specific embodiments, it is not intended to be limited to the specific form set forth herein. Rather, the invention is limited only by the accompanying claims and other embodiments than the specific above are equally possible within the scope of the appended claims. For example, while many of the various embodiments have been described mainly with respect to terminologies from the 3$^{rd}$ Generation Partnership Project (3GPP), this should not be seen as limiting the scope of the disclosed subject-matter to only the aforementioned methods, systems and apparatuses. Other wireless systems may also benefit from the teachings of this disclosure. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method of data demodulation performed by a user equipment (UE), wherein the UE is configured to utilize different demodulation pilots, said demodulation pilots including common pilots as well as additional pilots for data demodulation, the method comprising:
  receiving an order message from a radio network node over a downlink control channel, said order message ordering the UE to utilize both additional pilots and common pilots;
  transmitting an acknowledgement (ACK) message to said radio network node over an uplink control channel in response to receiving said order message;
  receiving data from said radio network node over a downlink data channel;
  demodulating received data utilizing additional pilots in addition to common pilots, and
  when decoding of said received data demodulated by utilizing additional pilots in addition to common pilots is unsuccessful, demodulating said received data utilizing common pilots only, wherein no new order message has been received from the radio network node.

2. The method according to claim 1, further comprising: transmitting a negative acknowledgement (NACK) message to the radio network node when decoding of said received data demodulated by utilizing only common pilots is unsuccessful.

3. The method according to claim 1, comprising:
  continuing demodulating received data utilizing only common pilots until another order message is received from a radio network node over the downlink control channel, said another order message ordering the UE to utilize both additional pilots and common pilots.

4. The method according to claim 1, wherein the downlink control channel is a High Speed-Shared Control Channel (HS-SCCH).

5. The method according to claim 1, wherein the uplink control channel is a High Speed-Dedicated Physical Control Channel (HS-DPCCH).

6. The method according to claim 1, wherein the downlink data channel is a High Speed-Physical Data Shared Channel (HS-PDSCH).

7. A user equipment (UE) configured to utilize different demodulation pilots, said demodulation pilots including common pilots as well as additional pilots for data demodulation, the UE comprising:
  a receiver configured to receive an order message from a radio network node over a downlink control channel, said order message ordering the UE to utilize both additional pilots and common pilots; and
  a transmitter configured to transmit, in response to the receiver receiving said order message, an acknowledgement (ACK) message to said radio network node over an uplink control channel; and
  the receiver being further configured to receive data from said radio network node over a downlink data channel; and the UE further comprising;
  a demodulator for data demodulation;
  a decoder for decoding received data;
  a processor; and
  a memory storing computer program code which, when run in the processor causes the demodulator to demodulate received data utilizing additional pilots in addition to common pilots,
  wherein the memory and the computer program code are configured to, with the processor, cause the demodulator to demodulate said received data utilizing only common pilots when the decoder is unsuccessful in decoding said received data demodulated by utilizing additional pilots in addition to common pilots, wherein no new order message has been received from the radio network node.

8. The UE according to claim 7, wherein the transmitter is configured to transmit a negative acknowledgement (NACK) message to the radio network node when the decoder is unsuccessful in decoding said received data demodulated by utilizing common pilots only.

9. The UE according to claim 7, wherein the memory and the computer program code are configured to, with the processor, cause the demodulator to continue demodulating received data utilizing only common pilots until the receiver receives another order message from a radio network node over the downlink control channel, said another order message ordering the UE to utilize both additional pilots and common pilots.

10. The UE according to claim 7, wherein the downlink control channel is a High Speed-Shared Control Channel (HS-SCCH).

11. The UE according to claim 7, wherein the uplink control channel is a High Speed-Dedicated Physical Control Channel (HS-DPCCH).

12. The UE according to claim 7, wherein the downlink data channel is a High Speed-Physical Data Shared Channel (HS-PDSCH).

* * * * *